United States Patent Office 3,529,405
Patented Sept. 22, 1970

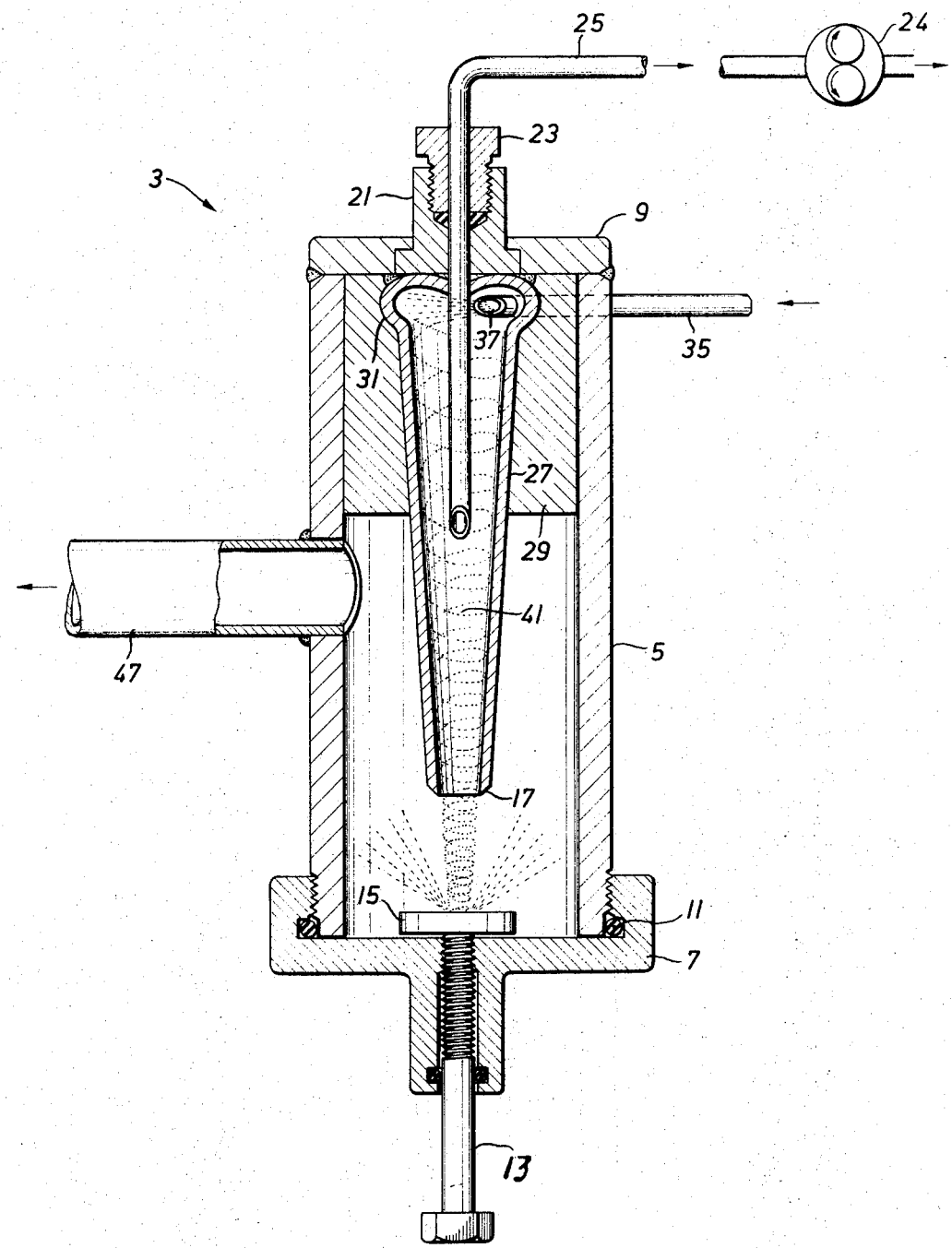
Clifford Logan Ashbrook
INVENTOR
BY Bernard A. Reiter
ATTORNEY

3,529,405
SEPARATOR
Clifford Logan Ashbrook, 5410 N. Braeswood 916,
Houston, Tex. 77035
Filed July 9, 1968, Ser. No. 743,509
Int. Cl. B01d *19/00*
U.S. Cl. 55—191       7 Claims

ABSTRACT OF THE DISCLOSURE

The separator consists of a housing having an upper fluid inlet and a lower fluid outlet in the sides of the housing. An inverted conical tube is disposed internally of the housing and is influid communication with the fluid inlet. The upper fluid inlet tangentially intersects the inverted conical tube so as to create a rotating vortex upon introduction of the mixture thereto. Axially disposed within the vortex tube at the upper end is a withdrawal tube for removing lighter mixture components that are drawn toward the center of the tube. At the lower end of the vortex tube is an adjustable impact plate for transmitting a concussion wave through the vortexed body so as to cause cavitation therein. Heavier mixture components gravitate toward the lower fluid outlet and are withdrawn therethrough.

BACKGROUND OF THE INVENTION

This invention pertains to fluid separation. More specifically, however, it pertains to fluid separation by utilization of the phenomena of vortex technology.

The separator device disclosed herein provides for the stripping or separation of fluid mixtures in a most economical and efficient manner. The separator is characterized by a substantial absence of moving parts and therefore is not only easy to maintain but simple to operate. Nevertheless, it operates on a sophisticated combination of wave theory principles which include vortex flow analysis and concussion wave effect, the latter referred to also as "cavitation." In that the principles of operation pertain generically to wave and fluid characteristics, the device may be utilized for separating a gas entrained in the liquid vortex or for separating liquids of varying vapor pressures. One application for example may be in the deaeration of water so as to improve potability. It will be readily recognized, however, upon a reading of the following specification, that the device will have a multitude of potential applications and uses. With reference now to the drawing:

The sole drawing is a cross-sectional elevation of an exemplary form of the preferred apparatus according to the invention.

The separator 3 essentially comprises an outer tubular member or housing 5 of elongate configuration. The housing includes the bottom cup shaped base 7 and upper wall 9. The base may include an O-ring seal 11 for maintaining the internal integrity of the housing. Extending centrally through the base 7 is an adjusting screw 13 having cavitation plate 15 affixed to the end thereof internally of the housing. The relative distance of the plate from the exit end 17 of the vortex tube may thus be adjusted in accordance with the principals discussed hereafter.

The upper wall 9 includes a central, axially disposed aperture for receiving fixture 21 and threaded annular bolt 23 therein. A withdrawal tube 25 extends axially of the housing through the bolt 23 and down into the vortex tube 27. The tube 25 is connected to a vacuum pump 24. The vortex tube 27 is fixedly disposed within the housing by means of retainer block 29 which extends from the upper wall 9 to approximately half way down the tube length. The tube 27 itself is of generally frusto-conical configuration with the divergent or lower end disposed proximate the plate 15 and the upper end adjacent the upper wall 9. Although the slope of the tube wall may range from one (1) to three (3) degrees or more of vertical, the uppermost and is characterized by expanded fluid receiving section 31 which, like the tube itself, is circular in the horizontal plane. The section 31 is semi-elliptical in the vertical plane. Convergence of the tube at the fluid exit end enhances the fluid vortex as it descends toward the cavitation plate where continuous impact of the fluid stream occurs. Fluid is injected under pressure into the tube through the inlet conduit 35 which is fixedly disposed in tangential manner to the fluid receiving section 31. The conduit 35 is substantially in the horizontal plane of receiving section 31, thus allowing shaped mouth 37 of the conduit to project the fluid mixture directly onto the wall of section 31 to create a whirling or rotating pressurized mass or body of fluid.

In operation of the above described invention, the fluid for example may constitute a mixture of adsorbed oxygen and water. The mixture is injected into the vortex tube 27 through inlet conduit 35, under a pressure of about 54 p.s.i.g. at ambient temperatures. As the fluid enters the section 31 of the vortex tube there is created, by reason of the tangentially directed conduit 35 and shaped mouth 37, a downwardly advancing hollow cylindrical fluid body made up of substantially laminar flow characteristics. The fluid body rotates in rapid manner about the vertical axis 41 so as to produce a central vortex having a pressure therealong which is greatly reduced with respect to that of the inlet pressure and substantially lower than that of the atmospheric pressure. The pressure within the vortex body is further reduced as the body advances toward the exit end 17 of the tube due to the reduced radius and hence increased acceleration, such that the pressure proximate that end may for example be about .4 p.s.i.a. It is this characteristic of vortex flow; that is, the tendency towards attainment of a vacuum within a conical tube as the vortex body therein approaches the convergent end, which enables separation of the fluid constituents. It will be recognized, in view of the reduced pressure within the tube 27, that the likelihood of molecular transference and intermolecular attraction of the fluid is increased such that the molecules of fluid constituents with high partial pressures will tend to separate out of the body before those of low partial pressure. Actual separation of the molecules from the constituent fluid is substantially accomplished, however, by a repetitive concussion wave created by retroversion along the flow path upon impact with plate 15 which is adjustably disposed between the exit end 17 of tube 27 and base 7 of enclosure or housing 5. This wave is created by the impact of the vortex body with the plate. There occurs, on impact, a high fluid shear resulting in complete turbulent flow and radially outward movement of the body from the plate area. Due to the constant flow of fluid onto and away from the plate the wave is transmitted upward toward the downwardly moving body and exerts thereon a repetitive concussion wave analogous to a cavitation-like effect. The mechanical effect of the wave on the downwardly advancing body is to cause actual separation of molecules having a high partial pressure. As these molecules escape to the vortex axis they are removed from the vortex tube by withdrawal tube 25 which is maintained at a pressure below that of the vortex axis by the pump 24. The pressure at the mouth of the withdrawal tube will therefore be less since the pressure at the axis of the vortex near the tube exit end 17 approaches that of a vacuum. In view of the above explanation it will be recognized that movement of the plate 15 will cause variation of the pressure in the compressive wave transmitted in the vortex.

If, for example, the mixture is absorbed oxygen and H₂O, by lowering of the pressure to something less than .4 p.s.i.a., oxygen may be pulled through conduit 25, leaving the water to exit under pressure through outlet conduit 47, through which it may be conveyed to appropriate storage means, or to a subsequent separator for further purification. In the latter type arrangement, a cascade type system may easily be constructed by simply connecting conduit 47 into an inlet conduit such as 35 or the effluent could simply be recirculated in the same separator.

Thus it will be seen that the invention provide a novel means and method for separating or stripping fluid mixturs having constituents with differing partial pressures and it will be recognized that various modifications not herein discussed may be utilized within the spirit of the invention and the scope of the appended claims:

That which is desired to be secured by United States Letters Patent is:

1. A device for separating components of fluid mixtures in which the components exist in the mixture at different respective partial pressures comprising:

a fluid enclosure having vortex means therein for enhancing vortex-like flow from one end to the other of a fluid mixture injected thereinto, an inlet for injecting a fluid mixture into said enclosure at one of its ends and first and second outlet means for removing respective components of the mixture each having different partial pressures, and the first of said outlet means disposed at the axis of the vortex means for removing from the device fluid components of the mixture having elevated partial pressures, the removal being accomplished due to the reduced pressure characteristically existing along the axis of a vortex flowing fluid, separating means disposed at the axis of the vortex means and at the opposite end of the enclosure from the first outlet means including an impact plate, said impact plate being positioned between the end of the vortex means and the end of the fluid enclosure and being of such size as to receive thereon the total flow of the vortexed fluid mixture except that which exits through the first outlet means so that all of the fluid which exits the vortex means strikes the impact plate to cause retroversion along the fluid flow path in order to set up a repetitive cavitating concussion wave within the flowing fluid vortexed mixture which separates out substantially all the molecules of fluid having higher partial pressures.

2. In the separator device of claim 1 wherein the vortex means includes a tubular cone in which the interior walls slope axially inwardly from the top to the bottom thereof, the bottom of the cone being spaced from the bottom of said fluid enclosure so as to allow fluid communication between the vortex means and said second outlet means.

3. The device of claim 2 wherein the bottom of said fluid enclosure has means operatively affixed thereto for adjusting the distance between the bottom of said cone and the fluid impact plate therebeneath.

4. The device of claim 2 wherein said vortex means further includes an entry section disposed at the upper end thereof, said entry section being so disposed with respect to the inlet as to receive the fluid mixture along the inner surface thereof.

5. The device of claim 3 wherein said vortex means further includes an entry section disposed at the upper end thereof, said entry section being so disposed with respect to the inlet as to receive the fluid mixture along the inner surface thereof.

6. The device of claim 1 wherein the first outlet means disposed at the axis of the vortex means includes a withdrawal tube which extends substantially into the fluid vortexed flow body along the longitudinal axis thereof, said withdrawal tube being operatively connected to a vacuum pump so as to effect removal of the fluid molecules having higher partial pressures, which molecules move to the near vacuum center of the vortexed flow.

7. The device of claim 6 wherein said inlet includes a fluid receiving section the radial dimension of which is gradually expanded with respect to the entry end dimension of the vortex means.

References Cited

UNITED STATES PATENTS

| | | | |
|---|---|---|---|
| 2,662,215 | 3/1954 | Schmid | 55—204 |
| 2,811,219 | 10/1957 | Wenzl | 55—204 X |
| 3,101,313 | 8/1963 | Woodruff | 210—512 X |
| 3,163,508 | 12/1964 | Tuck et al. | 55—204 X |
| 3,204,772 | 9/1965 | Ruxton | 55—204 X |

REUBEN FRIEDMAN, Primary Examiner

R. W. BURKS, Assistant Examiner

U.S. Cl. X.R.

55—277